United States Patent Office 3,598,752
Patented Aug. 10, 1971

3,598,752
ULTRAVIOLET EMITTING CATHODO-
LUMINESCENT MATERIAL
Thomas E. Sisneros, Fort Wayne, and Joseph A. Davis, New Haven, Ind., assignors to International Telephone and Telegraph Corporation, Nutley, N.J.
No Drawing. Filed Apr. 14, 1967, Ser. No. 630,824
Int. Cl. C09k 1/54, 1/04
U.S. Cl. 252—301.4                    3 Claims

ABSTRACT OF THE DISCLOSURE

The invention herein provides a luminescent phosphor for use in cathode ray tubes or the like which is excitable by an electron beam and will emit in the ultraviolet spectral regions and having the general composition $$Ca_3Si_2O_7:Pb$$

Predetermined amounts of $CaCO_3$, $SiO_2$, and $PbF_2$ are fired between 1,300 to 1,450° C. for 1 to 10 hours to produce the phosphor.

RELATED PATENTS AND PUBLICATIONS

Patents and prior art which relate to this subject are Patents 2,846,403; 3,109,820; and 2,499,307 and the publication in the Journal of the Electrochemical Society, February 1957, by Klasens, Hockstra, and Cox.

BACKGROUND OF THE INVENTION

This invention relates to phosphors and particularly to phosphors which may be excited by an electron beam to emit energy in the ultraviolet spectral regions.

The prior art shows many examples of phosphors such as lead activated silicates which are excited by ultraviolet radiation and emit ultraviolet energy. These phosphors are old in the fluorescent lighting field.

The prior art shows several examples of phosphors used in phosphor screens which emit ultraviolet energy when excited by an electron beam. Two such screens which are commercially available in cathode-ray tubes utilize $2CaO \cdot MgO \cdot SiO_2:Ce,Li$ (JEDEC designation P–16) and ZnO:Zn (JEDEC designation P–15). Both of these materials are unsatisfactory for many applications, especially where aging characteristics are important. There are also many examples of phosphors, including lead-activated silicates which emit ultraviolet energy when excited by ultraviolet radiation of shorter wavelength. These materials, however, are not necessarily suitable for use as phosphor screens in electron tubes. Many materials which are highly efficient under ultraviolet excitation are relatively inefficient or unstable under electron beam excitation.

The advantages of the phosphor screen described in this invention are that it has higher efficiencies than P–15 phosphor screens, and it has good stability under electron beam excitation.

Therefore, it is possible to incorporate such phosphors in screens for cathode ray tubes where it is desired to utilize ultraviolet sensitive film for making a record of the events occurring on the phosphor screen.

This phosphor consists of calcium pyrosilicate activated with lead ($ca_3Si_2O_7:Pb$). The phosphor is prepared by mixing a suitable calcium compound (such as $CaCO_3$) with $SiO_2$ and a suitable lead compound (such as $PbF_2$). The mix is then fired to obtain the phosphor. Firing at a temperature of about 1100° C. gives a phosphor having an emission band with a peak at about 350 nm.; however, the emission intensity is rather low. Increasing the firing temperature to 1300°–1450° C. shifts the emission peak to about 375 nm. with the emission band 300–450 nanometers, and increases the emission intensity.

The lead concentration can vary from 0.5 to 10 mole percent. Also, excess $SiO_2$ can be used without a major effect on the emission properties. Alkali halides, such as LiCl, NaCl and KCl, can also be added to the mix and make it possible to reduce the preparation time without a loss in intensity. The starting materials are mixed by some method such as dry-blending or ball-milling. The mix is then pre-fired for about 1 hour at 850° C. followed by firing for 1–6 hours at 1300–1450° C. No special atmosphere is necessary. Other combinations of firing conditions (time, temperature, atmosphere) could conceivably be used. For instance one can pre-fire for 3 hours at 850° C. then fire for 10 hours at 1300–1450° C.

Some representative compositions were made with the following ingredients and according to the method described above.

Example I $Ca_3Si_2O_7:0.045Pb$

|  | G. |
|---|---|
| $CaCO_3$ | 30 |
| $SiO_2$ | 12 |
| $PbF_2$ | 1.1 |

Example II $Ca_3Si_2O_7:0.1Pb$

|  | G. |
|---|---|
| $CaCO_3$ | 30 |
| $SiO_2$ | 12 |
| $PbF_2$ | 2.5 |

Example III $Ca_3Si_2O_7:0.005Pb$

|  | G. |
|---|---|
| $CaCO_3$ | 30 |
| $SiO_2$ | 12 |
| $PbF_2$ | 0.12 |

Example IV $Ca_3Si_2O_7:0.045Pb$ (10% excess $SiO_2$)

|  | G. |
|---|---|
| $CaCO_3$ | 30 |
| $SiO_2$ | 13.2 |
| $PbF_2$ | 1.1 |

In this example the composition is basically calcium pyrosilicate activated with lead but there are some excess $SiO_2$ groups in the molecular matrix without changing the characteristics of the phosphor. We can go up to 20% excess $SiO_2$ without affecting the favorable characteristics of the compounds.

Example V $Ca_3Si_2O_7:0.045Pb, 0.045LiCl$

|  | G. |
|---|---|
| $CaCO_3$ | 30 |
| $SiO_2$ | 12 |
| $PbF_2$ | 1.1 |
| LiCl | 0.2 |

The LiCl acts as a flux to speed up the reaction but does not affect the characteristics of the phosphor.

Example VI $Ca_3Si_2O_7:0.045Pb, 0.045NaCl$

|  | G. |
|---|---|
| $CaCO_3$ | 30 |
| $SiO_2$ | 12 |
| $PbF_2$ | 1.1 |
| NaCl | 0.26 |

When excited by an electron beam such as in a cathode ray tube, the phosphors emit in the ultraviolet spectrum at 300–450 nanometers with peak emission for the phosphor of Example I at about 375 nm. This phosphor can be used for exposing dry process film such as that utilizing the new ultraviolet imaging materials being produced by Du Pont.

Another possible use is in combination with an ultraviolet photocathode as the intermediate stages in multistages in multistage image tubes.

This phosphor could be used in lamps utilizing Hg radiation as an excitation source (such as fluorescent lamps or high-pressure mercury lamps) or in electron tubes where the excitation is due to electron bombardment. It can be used wherever a phosphor emitting in the near UV region is desired. It is more stable than $Ca_2MgSi_2O_7$:Ce,Li (JEDEC designation P–16) and can, therefore, be used instead of P–16 for applications where aging characteristics are of particular importance.

We claim:
1. A method of preparing a luminescent material which emits ultraviolet radiation upon excitation by an electron beam including mixing predetermined quantities of a calcium compound $CaCO_3$ with $SiO_2$ and a lead compound $PbF_2$, to form $Ca_3Si_2O_7$:Pb and firing the mixture at a temperature of between 1300 to 1450° C. for 1 to 10 hours.

2. The method of claim 1 wherein the lead is present in the resulting compound in a concentration of between 0.5 to 10 mole percent.

3. The method of claim 2 including adding an alkali halide to the mixture to reduce preparation time.

References Cited

Chemical Abstracts, vol 56, April 1962, p. 8135h.

Klasens et al.: Ultraviolet Fluorescence of Some Ternary Silicates Activated with Lead, Journal of the Electrochemical Society, vol 104, No. 2, February 1957, pp. 93–94.

Nagy et al.: Calcium Zinc Silicate Phosphor, Journal of the Electrochemical Society, April 1952, pp. 137–139, vol. 99, No. 4.

HELEN M. McCARTHY, Primary Examiner

R. D. EDMONDS, Assistant Examiner

U.S. Cl. X.R.
313—92